US009224392B2

(12) United States Patent
Hirohata (10) Patent No.: US 9,224,392 B2
(45) Date of Patent: Dec. 29, 2015

(54) AUDIO SIGNAL PROCESSING APPARATUS AND AUDIO SIGNAL PROCESSING METHOD

(75) Inventor: Makoto Hirohata, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 786 days.

(21) Appl. No.: 13/420,912

(22) Filed: Mar. 15, 2012

(65) Prior Publication Data

US 2013/0035933 A1    Feb. 7, 2013

(30) Foreign Application Priority Data

Aug. 5, 2011    (JP) .................. P2011-172409

(51) Int. Cl.
| | | |
|---|---|---|
| *G10L 21/00* | (2013.01) | |
| *G10L 25/90* | (2013.01) | |
| *G10L 25/93* | (2013.01) | |
| *G10L 21/02* | (2013.01) | |
| *G10L 15/20* | (2006.01) | |
| *G10L 21/0216* | (2013.01) | |

(52) U.S. Cl.
CPC ....... *G10L 15/20* (2013.01); *G10L 2021/02163* (2013.01)

(58) Field of Classification Search
USPC ......................... 704/206, 208, 226
See application file for complete search history.

(56) References Cited

U.S. PATENT DOCUMENTS

| | | | | |
|---|---|---|---|---|
| 7,415,392 B2* | 8/2008 | Smaragdis | .......... | G10L 21/0272 375/240.12 |
| 7,536,029 B2* | 5/2009 | Choi | .......... | G01S 3/7864 348/14.04 |
| 8,015,003 B2 | 9/2011 | Wilson et al. | | |
| 8,080,724 B2* | 12/2011 | Kim | .......... | G10H 1/0008 702/196 |
| 8,346,692 B2* | 1/2013 | Rouat | .......... | G06K 9/4623 706/20 |
| 8,874,441 B2* | 10/2014 | Zhang | .......... | G10L 21/0208 379/392.01 |
| 2008/0071540 A1* | 3/2008 | Nakano et al. | .......... | 704/251 |

(Continued)

FOREIGN PATENT DOCUMENTS

| | | |
|---|---|---|
| JP | 2006-003617 | 1/2006 |
| JP | 4313728 | 5/2009 |

OTHER PUBLICATIONS

M.N. Schmidt et al., "Wind Noise Reduction Using Non-Negative Sparse Coding", Technical Uiversity of Denmark Informatics and Mathematical Modelling, IT University of Copenhagen, 6 pages.

(Continued)

*Primary Examiner* — Olujimi Adesanya
(74) *Attorney, Agent, or Firm* — Nixon & Vanderhye, P.C.

(57) ABSTRACT

Likelihood calculation means extracts audio features expressing features of a voice signal and a non-voice signal from an acquired audio signal, and calculates likelihood expressing probability that the voice signal is included in the audio signal using the audio features. Spectral feature extraction means performs a frequency analysis to the audio signal to extract a spectral feature. Using the spectral feature, first basis matrix producing means produces a first basis matrix expressing the feature of the non-voice signal. Second basis matrix producing means specifies a component having a high association with the voice signal in the first basis matrix using the likelihood, and excludes the component to produce a second basis matrix. Spectral feature estimation means estimates a spectral feature of the voice signal or a spectral feature of the non-voice signal by performing nonnegative matrix factorization to the spectral feature using the second basis matrix.

17 Claims, 7 Drawing Sheets

(56) References Cited

U.S. PATENT DOCUMENTS

| | | | |
|---|---|---|---|
| 2009/0190774 A1* | 7/2009 | Wang et al. | 381/92 |
| 2010/0017206 A1* | 1/2010 | Kim et al. | 704/233 |
| 2010/0174389 A1* | 7/2010 | Blouet et al. | 700/94 |
| 2010/0254539 A1* | 10/2010 | Jeong et al. | 381/56 |
| 2011/0078224 A1 | 3/2011 | Wilson et al. | |
| 2011/0224980 A1* | 9/2011 | Nakadai et al. | 704/233 |
| 2012/0093341 A1* | 4/2012 | Kim et al. | 381/94.7 |
| 2012/0185246 A1* | 7/2012 | Zhang et al. | 704/226 |
| 2012/0203719 A1* | 8/2012 | Mitsufuji et al. | 706/12 |
| 2013/0218570 A1* | 8/2013 | Imoto et al. | 704/270 |

OTHER PUBLICATIONS

E. Sheirer et al., "Construction and Evaluation of a Robust Multifeature Speech/Music Discriminator", Interval Research Corp., IEEE, 1997, pp. 1331-1334.

* cited by examiner

FIG. 7

AUDIO SIGNAL PROCESSING APPARATUS AND AUDIO SIGNAL PROCESSING METHOD

CROSS-REFERENCE TO RELATED APPLICATIONS

This application is based upon and claims the benefit of priority from the prior Japanese Patent Application No. 2011-172409, filed on Aug. 5, 2011, the entire contents of which are incorporated herein by reference.

FIELD

Embodiments described herein generally relate to an audio signal processing apparatus and an audio signal processing method.

BACKGROUND

In speech recognition, an audio signal acquired with a microphone includes not only a voice signal that is of a voice of a user but also a non-voice signal such as a background noise and music. A sound source separation technology is one that extracts only a desired signal from the audio signal in which the voice signal and the non-voice signal are mixed.

For example, the sound source separation technology includes a method in which nonnegative matrix factorization is used. In the method, when the voice signal is separated from the audio signal, a basis matrix of the non-voice signal is produced from a spectrogram of the audio signal in an interval having a high probability that the non-voice signal is included.

Then, using the basis matrix of the non-voice signal, a basis matrix and a coefficient matrix of the voice signal is produced from the spectrogram of the audio signal that becomes a separation target. The spectrogram of the voice signal is estimated from a product of the basis matrix and the coefficient matrix of the voice signal. Finally, the estimated spectrogram of the voice signal is transformed into a temporal signal to separate the voice signal from the audio signal.

However, in the method, the basis matrix of the non-voice signal cannot correctly be produced in the case that the voice signal is mixed in the audio signal in obtaining the basis matrix of the non-voice signal, which results in a problem in that audio signal separation performance is degraded. A problem to be solved by the invention is to construct an audio signal processing apparatus in which the audio signal separation performance is improved.

DETAILED DESCRIPTION

In view of the above circumstances, an aspect of embodiments provides an audio signal processing apparatus including; an audio acquisition unit configured to acquire an audio signal including a voice signal and a non-voice signal; a likelihood calculation unit configured to extract audio features expressing features of the voice signal and the non-voice signal from the audio signal, and calculating likelihood expressing probability that the voice signal is included in the audio signal using the audio features; a spectral feature extraction unit configured to perform a frequency analysis to the audio signal to extract a spectral feature; a first basis matrix producing unit configured to produce a first basis matrix expressing the feature of the non-voice signal using the spectral feature; a second basis matrix producing unit configured to specify a component having a high association with the voice signal in the first basis matrix using the likelihood, and excluding the component to produce a second basis matrix; and a spectral feature estimation unit configured to estimate a spectral feature of the voice signal or a spectral feature of the non-voice signal performing nonnegative matrix factorization to the spectral feature using the second basis matrix.

Hereinafter, an embodiment of the invention will be described with reference to the drawings.

First Embodiment

An audio signal processing apparatus according to an embodiment separates the voice signal from the audio signal including the voice signal and the non-voice signal. For example, the audio signal processing apparatus of the embodiment is utilized in pre-processing of the speech recognition, which allows improvement of recognition performance in the speech recognition.

The audio signal processing apparatus of the embodiment is based on the sound source separation technology (Japanese Patent Application Laid-Open No. 2009-128906) in which the nonnegative matrix factorization is used, and the audio signal processing apparatus produces a first basis matrix expressing a feature of the non-voice signal from the spectrogram (spectral feature) of the audio signal in an interval having a high probability that the non-voice signal is included. By utilizing voice likelihood expressing probability that the voice signal is included, a component having a high association with the voice signal is excluded from the first basis matrix to produce a second basis matrix. A third basis matrix and a first coefficient matrix, which express the feature of the voice signal, are calculated using the second basis matrix, and the spectrogram of the voice signal is estimated from a product of the third basis matrix and the first coefficient matrix. Finally, the estimated spectrogram of the voice signal is transformed into a temporal signal to separate the voice signal from the audio signal.

Thus, in the audio signal processing apparatus of the embodiment, the second basis matrix is produced by excluding the component having the high association with the voice signal from the first basis matrix of the produced non-voice signal. Therefore, the basis matrix correctly expressing the feature of the non-voice signal can be produced. As a result, the audio signal separation performance can be improved.

(Entire Block Configuration)

Figure 1:
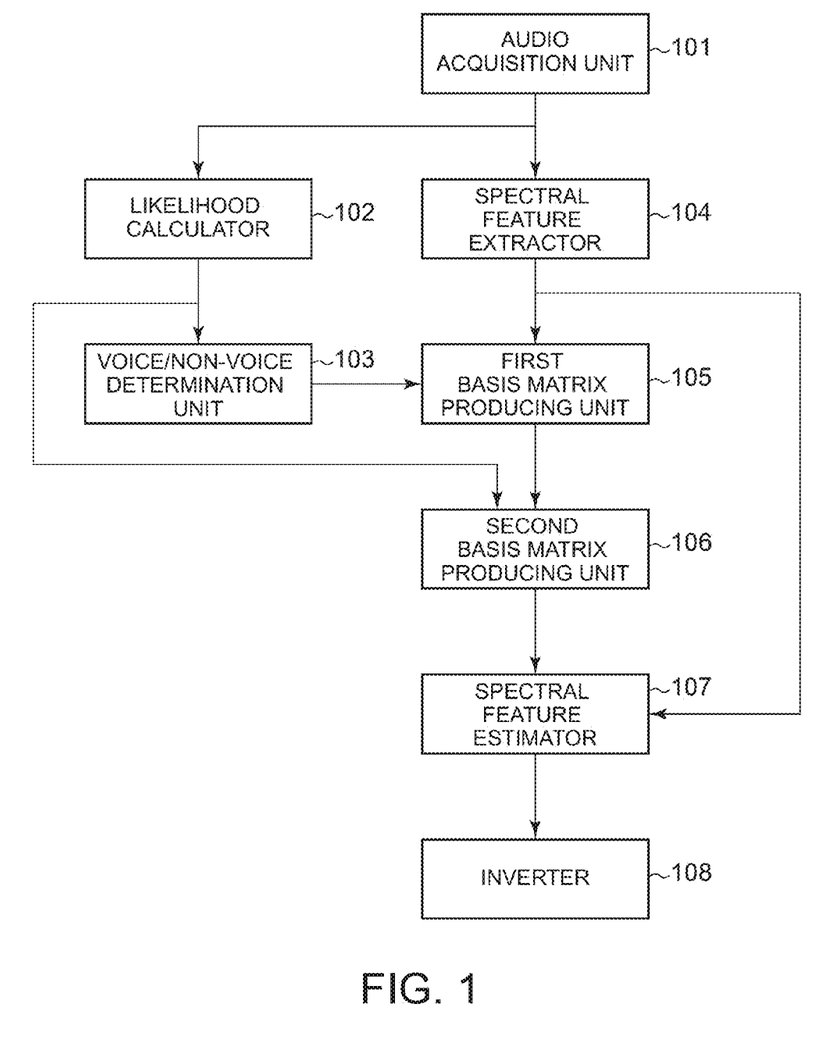
FIG. 1 is a block diagram illustrating an audio signal processing apparatus according to an embodiment.

FIG. 1 is a block diagram illustrating the audio signal processing apparatus of the embodiment. The audio signal processing apparatus includes: an audio acquisition unit 101 that acquires the audio signal including the voice signal and the non-voice signal; a likelihood calculator 102 that extracts audio features expressing features of the voice signal and the non-voice signal from the audio signal, and calculates voice likelihood expressing probability that the voice signal is included in the audio signal and non-voice likelihood expressing probability that the non-voice signal is included using the audio features; a voice/non-voice determination unit 103 that determines the voice or the non-voice in each predetermined interval of the audio signal using the voice likelihood and the non-voice likelihood; a spectral feature extractor 104 that performs a Fourier transformation to the audio signal to extract the spectrogram; a first basis matrix generator 105 that produces the first basis matrix expressing the feature of the non-voice signal using the spectrogram extracted from the audio signal in the interval determined to be the non-voice signal; a second basis matrix generator 106 that produces the second basis matrix by excluding the component having the high association with the voice signal from the first basis matrix using the likelihood; a spectral feature estimator 107 that calculates the third basis matrix and the first coefficient matrix, which express the feature of the voice signal, by performing the nonnegative matrix factorization to the spectrogram using the second basis matrix, and estimates the spectrogram of the voice signal included in the audio signal from the product of the third basis matrix and the first coefficient matrix; and an inverter 108 that performs an inverse Fourier transformation to transform the estimated spectrogram of the voice signal into the temporal signal.

(Hardware Configuration)

Figure 2:
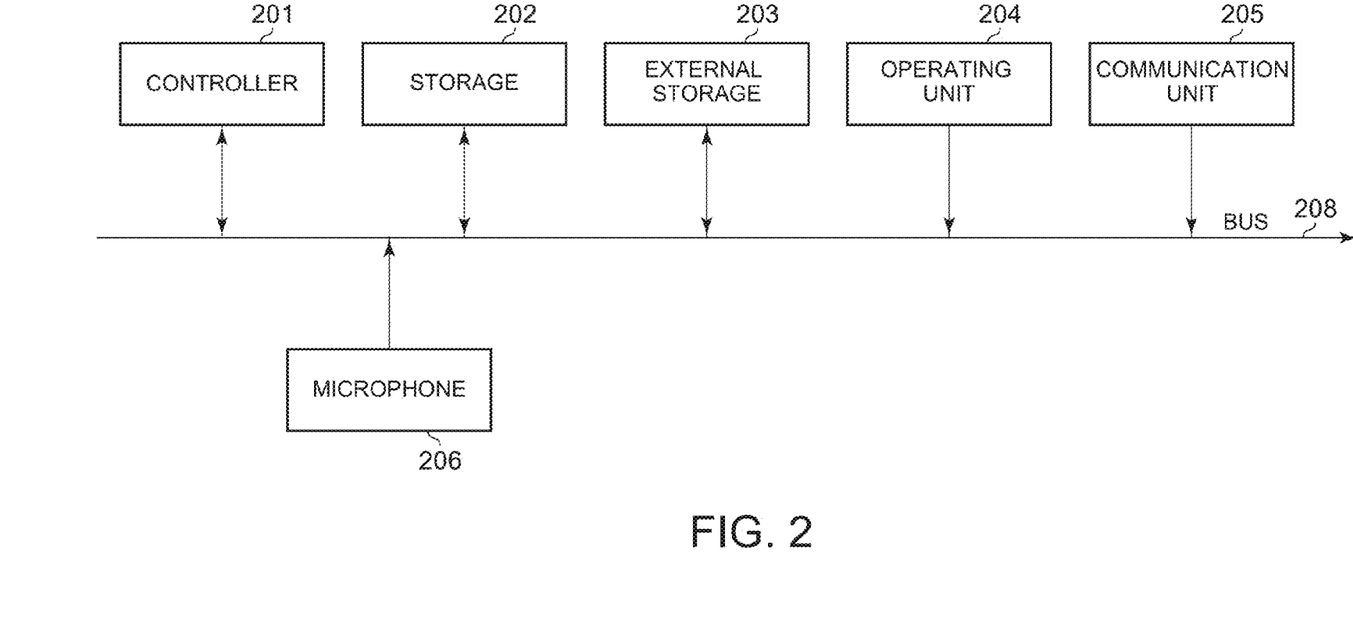
FIG. 2 is a view illustrating a hardware configuration of the audio signal processing apparatus of the embodiment.

The audio signal processing apparatus is constructed by hardware in which a usual computer is used as illustrated in FIG. 2. The audio signal processing apparatus includes a controller 201 such as a CPU (Central Processing Unit) that controls the whole apparatus, a storage 202 such as ROM (Read Only Memory) and RAM (Random Access Memory) in which various pieces of data and various programs are stored, an external storage 203 such as an HDD (Hard Disk Drive) and a CD (Compact Disk) drive in which various pieces of data and various programs are stored, an operation unit 204 such as a keyboard and a mouse that receives a user's instruction input, a communication unit 205 that controls communication with an external device, a microphone 206 that acquires voice production of the user; and a bus 208 that connects the units to one another.

In the above hardware configuration, the controller 201 executes various programs stored in are stored in the storage 202 such as the ROM and the external storage 203, thereby implementing the following functions.

(Function of Each Block)

The audio acquisition unit 101 acquires the audio signal input to the microphone 206. The audio signal includes not only the voice signal that is of the voice of the user but also the non-voice signal such as the background noise and the music. In the embodiment, it is assumed that the audio signal is a digital signal sampled at 16 kHz. The audio acquisition unit 101 may acquire the audio signal from not the microphone 206 but the external storage 203 or an external device connected to the communication unit 205.

The likelihood calculator 102 extracts the audio features expressing the voice signal and the non-voice signal from the audio signal acquired by the audio acquisition unit 101. Using the audio features, the likelihood calculator 102 calculates a probability (voice likelihood, or a voice plausibility) that the voice signal is included in the audio signal and a probability (non-voice likelihood or a non-voice plausibility)) that the non-voice signal is included. Specifically, the likelihood calculator 102 divides the audio signal into frames each of which has a length of 25 ms (400 samples) and a spacing of 8 ms (128 samples). A Hamming window is used in the frame division. Then the audio feature is extracted from each frame. Not only the spectrum that is obtained by performing a Fourier transformation to the audio signal of each frame but also a cepstrum system feature amount such as an LPC cepstrum and an MFCC can be used as the audio feature. The extracted audio feature is checked against previously-learned voice model and non-voice model to calculate the voice likelihood and the non-voice likelihood of each frame.

The voice/non-voice determination unit 103 determines whether the voice signal is the voice or non-voice using the voice likelihood and the non-voice likelihood of each frame, which are calculated by the likelihood calculator 102. In the embodiment, a length of a predetermined interval is set to 400 ms (for 50 frames). The voice/non-voice determination unit 103 calculates average values of the pieces of voice likelihood and the pieces of non-voice likelihood for 50 frames, and compares the average values to determine the voice or the non-voice. Alternatively, each average value may be compared to a previously-set threshold to determine the voice or the non-voice. Alternatively, a method described in Eric Scheirer, Malcolm Slaney, "Construction and Evaluation of a Robust Multifeature Speech/Music Discriminator," Proc. of ICASSP, April 1997, Vol. 2, p. 1331-1334 may be used.

The spectral feature extractor 104 divides the audio signal into the frames each of which has the length of 25 ms (400 samples) and the spacing of 8 ms (128 samples), and performs the Fourier transformation (frequency analysis) to the audio signal of each frame to extract the spectrum. In the embodiment, after 112-point zero padding is performed to each frame, a 512-point discrete Fourier transformation is performed to each frame.

The first basis matrix generator 105 produces a first basis matrix H expressing the feature of the non-voice signal using spectra (spectrograms) of the plural frames extracted by the spectral feature extractor 104. In the embodiment, the first basis matrix H is produced using the spectrogram extracted from the audio signal in the interval in which the voice/non-voice determination unit 103 determines that the audio signal is the non-voice.

The first basis matrix generator 105 produces an F×T (the number of rows is F and the number of columns is T) matrix Z in which all elements of each of F-dimensional spectra extracted from T frames are stored. Then the first basis matrix generator 105 approximates the matrix Z by a product of an F×D first basis matrix H and a D×T coefficient matrix U. Where D is the number of basis, and D is empirically set to 32. The first basis matrix H and the coefficient matrix U are derived by an iteration method based on a root mean square error between the matrix Z and a product of the first basis matrix H and the coefficient matrix U. At this point, a random value can be used in initial matrices of the first basis matrix H and the coefficient matrix U.

Using the voice likelihood calculated by the likelihood calculator 102, the second basis matrix generator 106 produces a second basis matrix B in which a component of a column vector having a high association with the voice signal is excluded from the first basis matrix H.

Figure 3:
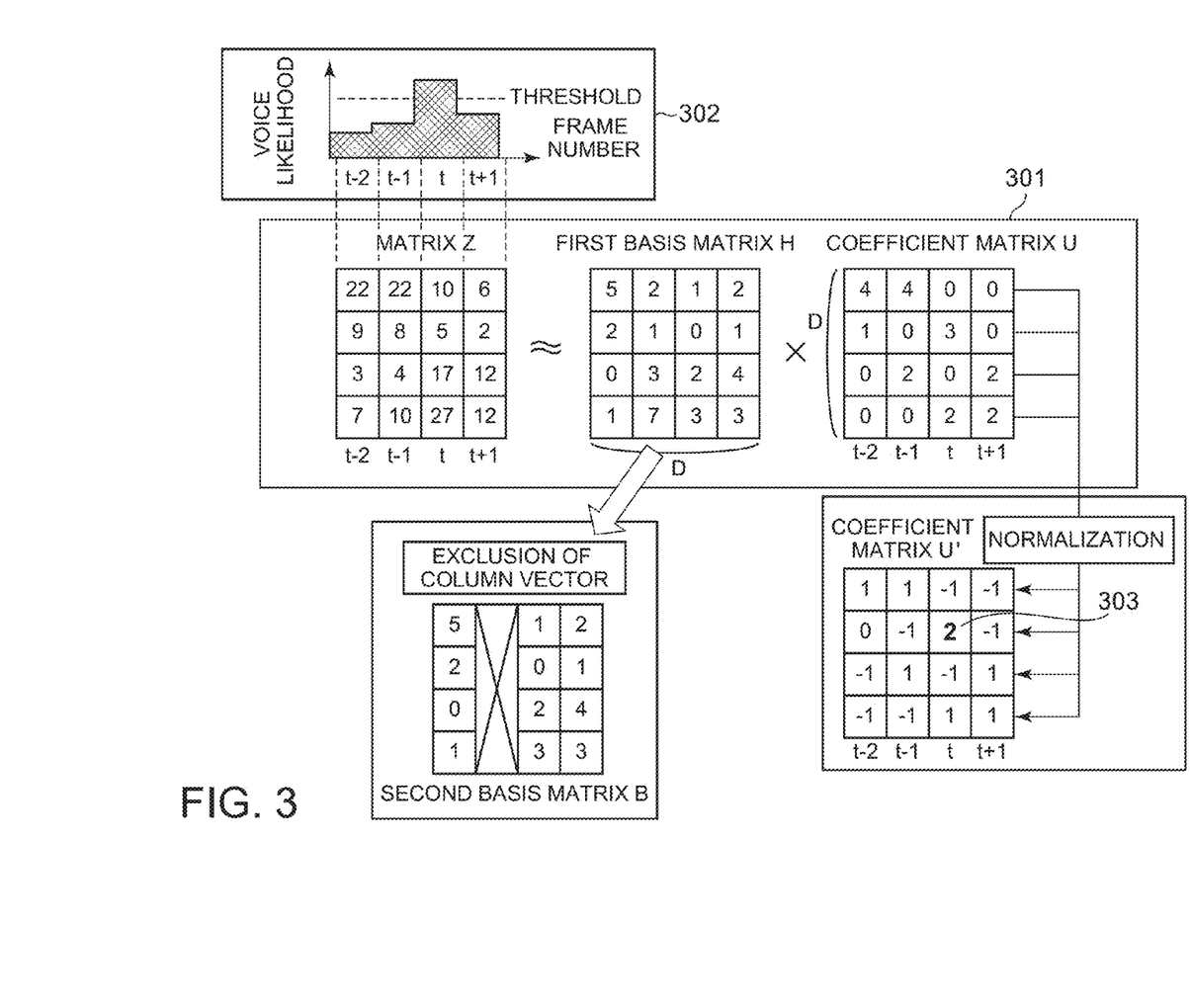
FIG. 3 is a view illustrating a processing content in a second basis matrix generator of the embodiment.

An action of the second basis matrix generator 106 will be described with reference to FIG. 3. Referring to FIG. 3, in a box 301, the matrix Z constructed by 4-dimensional spectral elements extracted from 4 frames is approximated by a product a 4×4 first basis matrix H and a 4×4 coefficient matrix U. A box 302 expresses the voice likelihood corresponding to each frame (column vector) of the matrix Z. A threshold in the box 302 is a value used to determine the frame including the voice signal, and the threshold is previously set to a predetermined value. In the example of FIG. 3, a determination that the voice signal is included in the audio signal of a t-th frame is made by a comparison of the threshold and the voice likelihood. Accordingly, the second basis matrix generator 106 producing the second basis matrix B by excluding the component attributed to the t-th frame from the first basis matrix H.

The second basis matrix generator 106 performs normalization processing to each row of the coefficient matrix U and obtains a coefficient matrix U' of post-normalization. The normalization is processing of comparing sizes of the elements of the column vectors, and the normalization processing is performed such that the element of each row becomes an average of 0 and a dispersion of 1. Then the second basis matrix generator 106 selects the element having the maximum value in the column vectors of the coefficient matrix U' corresponding to the t-th frame. The element is specified like an element in an X-th row and Y-th column of the coefficient matrix U'. In the example of FIG. 3, an element 303 in the second row and the third column becomes the maximum. Then the second basis matrix generator 106 excludes the Xth-column column vector, in which a product of the element in the X-th row and the Y-th column of the coefficient matrix U and the X-th-column column vector is calculated, in the product of the first basis matrix H and the coefficient matrix U. In the example of FIG. 3, because the element in the second row and the third column of the coefficient matrix U' is selected, the second basis matrix B is produced by excluding the second-column column vector from the first basis matrix H.

As described above, the audio signal processing apparatus of the embodiment produces the second basis matrix B, in which the component of the column vector having the high association with the voice signal is excluded from the first basis matrix H. Therefore, the second basis matrix B expressing a characteristic of the non-voice signal can correctly be produced.

The second basis matrix generator 106 may produce the second basis matrix B by excluding plural column vectors. Alternatively, the column vector is not excluded, but the value of element in the column vector may be replaced with 0 or a value close to 0. The second basis matrix B is stored in the storage 202 or the external storage 203, and separation processing may be performed to another audio signal by reusing the stored second basis matrix B.

In the embodiment, the component having the high association with the voice signal is specified using the voice likelihood. Alternatively, a ratio of the non-voice likelihood and the voice likelihood may be used. Alternatively, the component having the high association with the voice signal is specified using only the non-voice likelihood. For example, the frame having the low non-voice likelihood may be regarded as the component having the high association with the voice signal.

Figure 4:
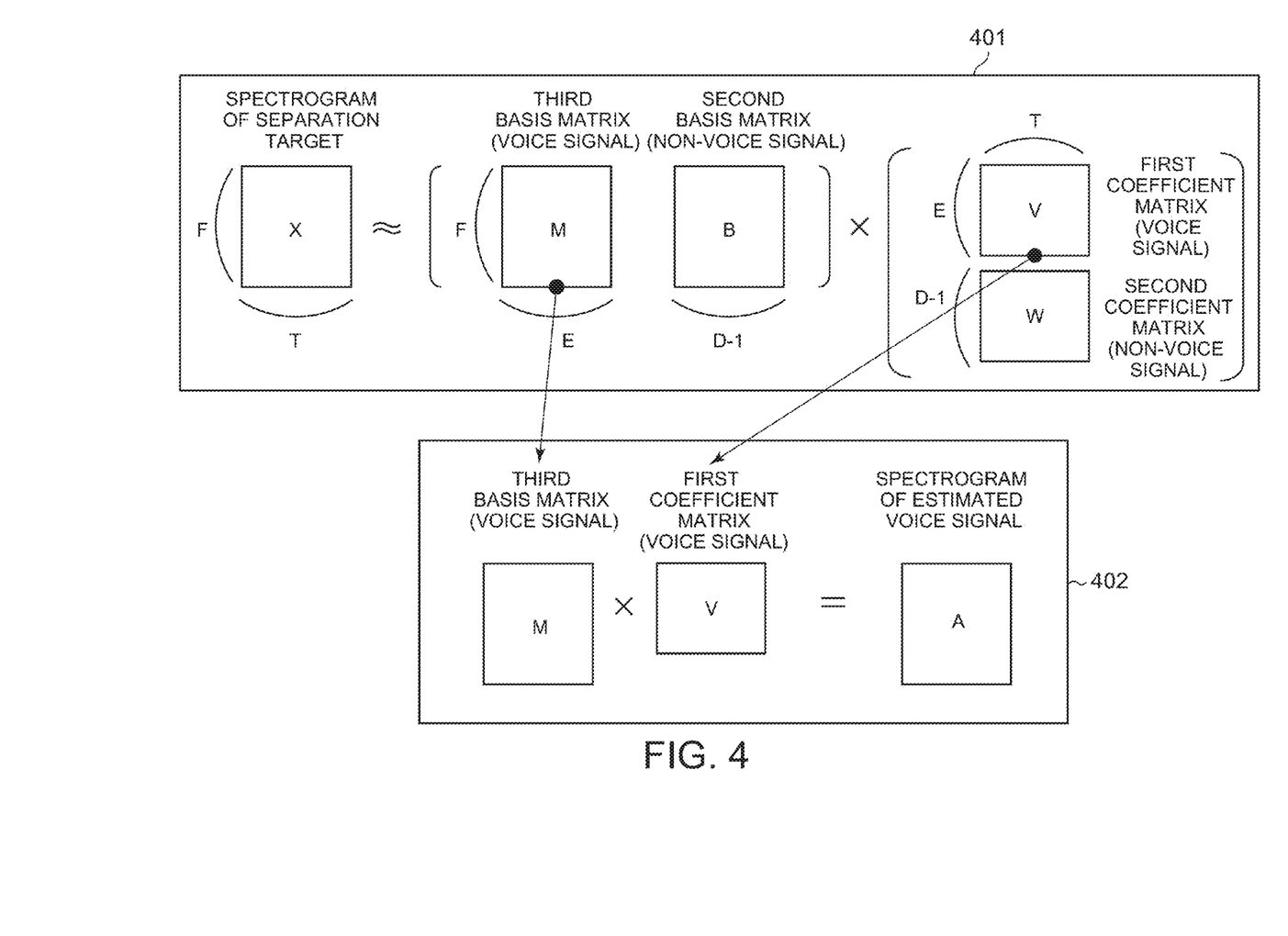
FIG. 4 is a view illustrating a processing content in a spectral feature estimator of the embodiment.

The spectral feature estimator 107 performs the non-negative matrix factorization to the spectral feature extracted by the spectral feature extractor 104 using the second basis matrix B, thereby computing a third basis matrix M and a first coefficient matrix V, which express the feature of the voice signal. The spectral feature estimator 107 estimates the spectral feature included in the audio signal by taking a product of the third basis matrix M and the first coefficient matrix V.

As illustrated in a box 401 of FIG. 4, using the second basis matrix B, the spectral feature estimator 107 performs the nonnegative matrix factorization to a spectrogram X of the audio signal that becomes the audio signal separation target. The iteration method, based on the root mean square error between the spectrogram X and the product of the basis matrix and the coefficient matrix, is adopted similarly to the derivation of the first basis matrix H. At this point, the number of columns of the basis matrix is set to a value E+D−1 larger than the number of columns D−1 of the second basis matrix B, and initial values from E-th columns of the basis matrix are used as elements of the second basis matrix B. It is assumed that the iteration method does not cover the elements from E-th columns of the basis matrix. As a result of adopting the iteration method, the first-column to E-th-column matrices of the basis matrix constitute the third basis matrix M, the first-column to E-th-column matrices of the coefficient matrix constitute the first coefficient matrix V, and the matrices from the E-th-column matrix constitute a second coefficient matrix W.

Then the spectral feature estimator 107 estimates the spectrogram of the voice signal included in the audio signal by taking the product of the third basis matrix M and the first coefficient matrix V (box 402 in FIG. 4). Alternatively, the spectrogram of the non-voice signal included in the audio signal may be estimated by taking the product of the second basis matrix B and the second coefficient matrix W, which express the feature of the non-voice signal.

Alternatively, the spectral feature estimator 107 may calculate a ratio of the component attributed to the voice signal in each element of the spectrogram from the voice signal spectrogram estimated by the product of the third basis matrix M and the first coefficient matrix V and the non-voice signal spectrogram estimated by the product of the second basis matrix B and the second coefficient matrix W, and estimate the voice signal spectrogram by multiplying the spectrogram of the separation target by the ratio.

The inverter 108 transforms the estimated voice signal spectrogram into the temporal signal by performing a discrete inverse Fourier transformation to the estimated voice signal spectrogram. This enables the voice signal to be separated from the audio signal. The separated voice signal is output to a speech recognition unit (not illustrated) of a subsequent stage, which allows the speech recognition processing to be performed while an influence of the non-voice signal is removed.

(Flowchart: Entire Processing)

Figure 5:
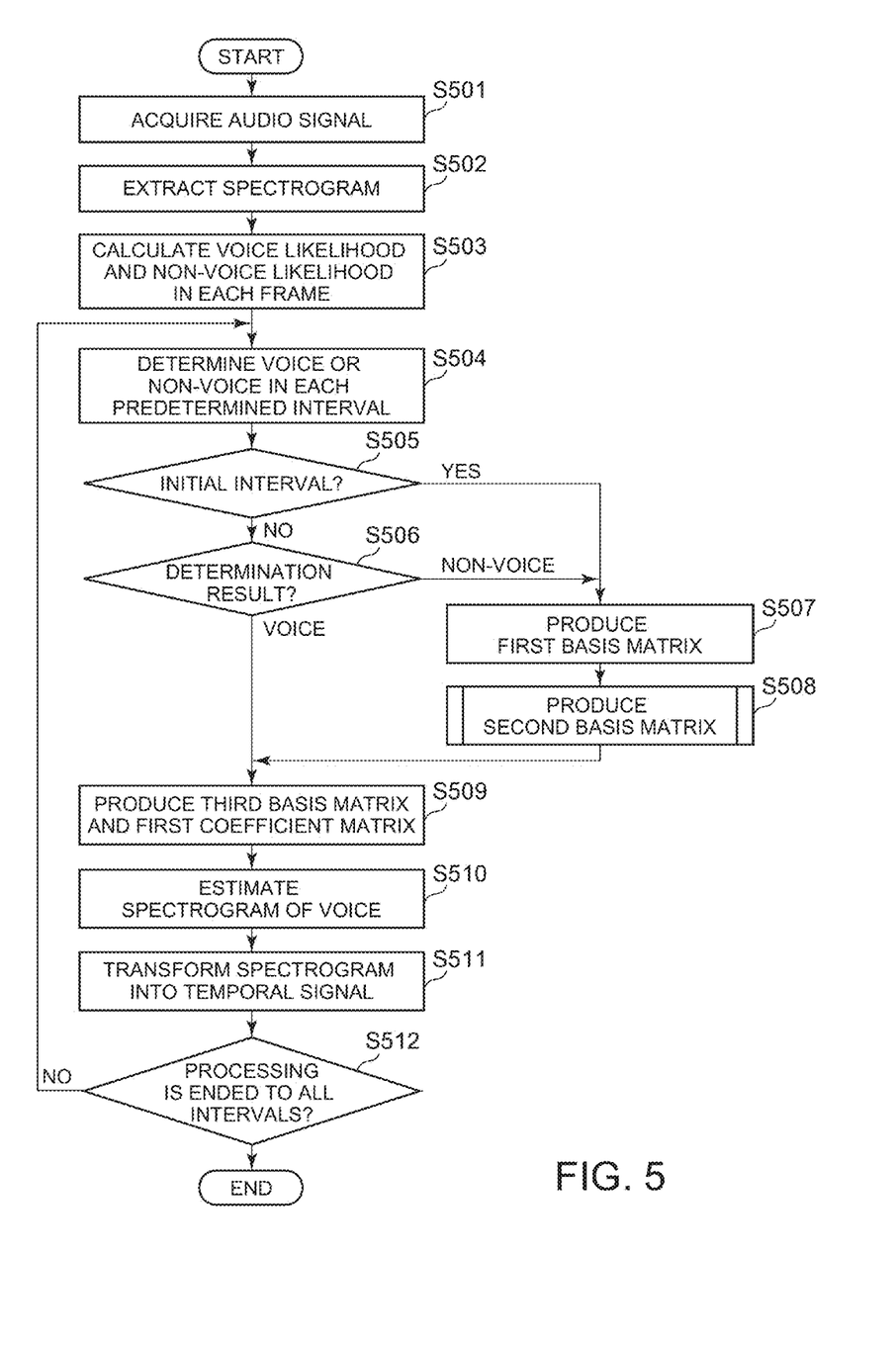
FIG. 5 is a flowchart of the audio signal processing apparatus of the embodiment.

Processing of the audio signal processing apparatus of the embodiment will be described with reference to a flowchart of FIG. 5. In Step S501, the audio acquisition unit 101 acquires the audio signal of the separation target.

In Step S502, through the discrete Fourier transformation, the spectral feature extractor 104 extracts the spectrum from the audio signal divided into the frames. The spacing of the frame is set to 8 ms.

In Step S503, the likelihood calculator 102 extracts the cepstrum audio feature such as the LPC cepstrum and the MFCC from the audio signal. The audio feature is checked against the previously-learned voice model and non-voice model to calculate the voice likelihood and the non-voice likelihood.

In Step S504, the voice/non-voice determination unit 103 determines the voice or the non-voice in each predetermined interval having the length of 400 ms (for 50 frames). The voice likelihood and the non-voice likelihood, which are calculated in Step S503, are used in the determination.

In Step S505, processing is branched based on whether the interval of the determination target is the initial interval. When the interval of the determination target is the initial interval, because the basis matrix of the non-voice signal is not produced, the flow goes to Step S507 irrespective of the determination result in Step S504. When the interval of the determination target is not the initial interval, the flow goes to Step S506.

In Step S506, processing is branched based on a determination result of the interval of the determination target. The flow goes to Step S507 when the determination result is the non-voice, and the flow goes to Step S509 when the determination result is the voice.

In Step S507, using the spectrogram extracted from the interval of the determination target, the first basis matrix generator 105 produces the first basis matrix H and the coefficient matrix, which express the feature of the non-voice signal.

In Step S508, using the voice likelihood calculated in Step S503, the second basis matrix generator 106 produces the second basis matrix B in which the component of the column vector having the high association with the voice signal is excluded from the first basis matrix H. The detailed processing in Step S508 is described later.

In Step S509, using the second basis matrix B, the spectral feature estimator 107 performs the nonnegative matrix factorization to the spectrogram, which is extracted from the 400-ms (50-frame) interval whether the interval is the voice or the non-voice is determined in Step S504, and the spectral feature estimator 107 calculates the third basis matrix M and the first coefficient matrix V, which express the feature of the voice signal.

In Step S510, the spectral feature estimator 107 obtains an estimated value of the voice signal spectrogram from the product of the third basis matrix M and the first coefficient matrix V. The estimated number of frames of the voice signal spectrogram becomes 50.

In Step S511, the inverter 108 transforms the voice signal spectrogram estimated in Step S510 into the temporal signal through the discrete inverse Fourier transformation.

In Step S512, the audio signal processing apparatus determines whether the audio signal separation processing is ended for all the intervals. When the audio signal separation processing is not ended for all the intervals, the flow goes to Step S504 to determine the voice or the non-voice in the next 400-ms interval.

(Flowchart: Second Basis Matrix Generator)

Figure 6:
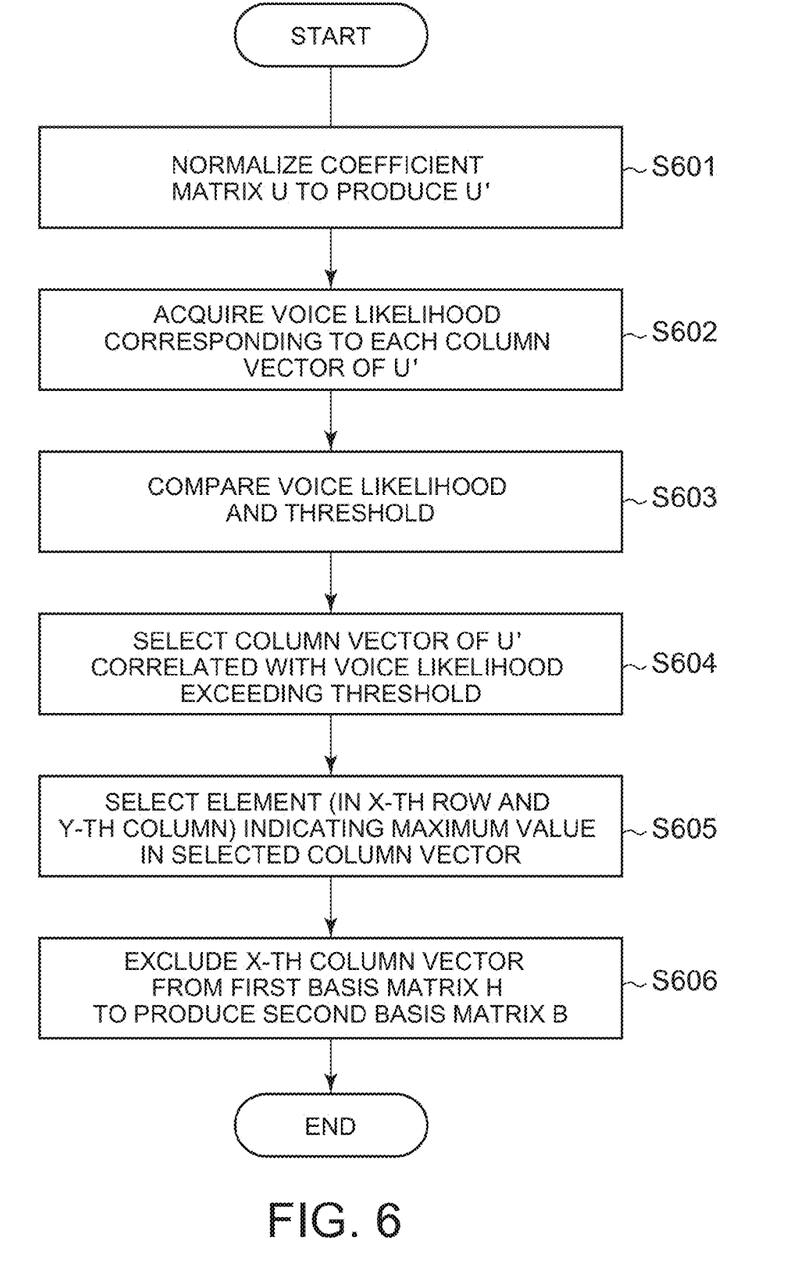
FIG. 6 is a flowchart of the second basis matrix generator of the embodiment.

The detailed processing in Step S508 of producing the second basis matrix B will be described with reference to a flowchart of FIG. 6. In Step S601, the second basis matrix generator 106 performs the normalization in each row of the coefficient matrix U to obtain the coefficient matrix U'.

In Step S602, the second basis matrix generator 106 obtains the voice likelihood corresponding to each column vector of the normalized coefficient matrix U'.

In Step S603, the second basis matrix generator 106 compares the voice likelihood and the previously-set threshold.

In Step S604, the second basis matrix generator 106 selects the column vector of the coefficient matrix U' correlated with the voice likelihood exceeding the threshold. In the case of the plural frames in each of which the voice likelihood exceeding the threshold, the plural column vectors are also selected.

In Step S605, the second basis matrix generator 106 selects the element indicating the maximum value in each column vector selected in Step S604. The element is selected like the element in the X-th row and the Y-th column of the coefficient matrix U'. In the case of the plural column vectors, the plural elements are also selected.

In Step S606, the second basis matrix generator 106 excludes the X-th-column column vector, in which the product of the element in the X-th row and the Y-th column of the coefficient matrix U and the X-th-column column vector is calculated, from the first basis matrix H in the product of the first basis matrix H and the coefficient matrix U. Through the above processing, the second basis matrix generator 106 can produce the second basis matrix B in which the influence of the voice signal is removed.

Figure 7:
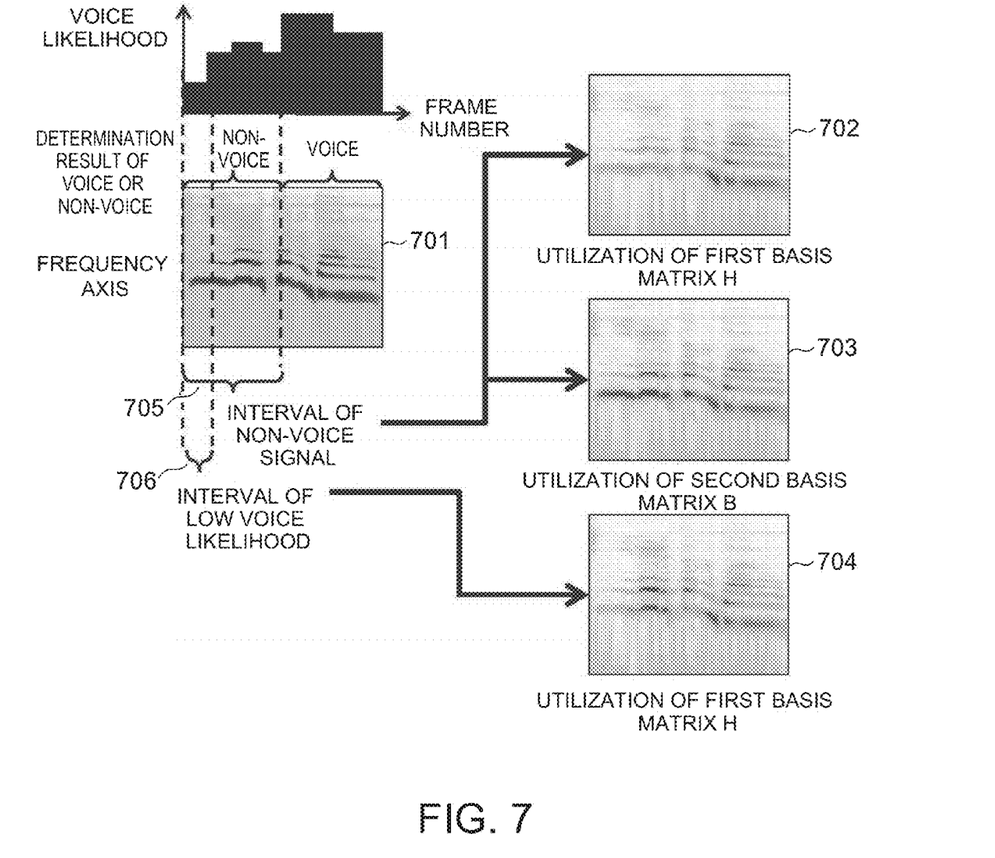
FIG. 7 is a view illustrating a spectrogram of voice signal estimation result of the embodiment.

FIG. 7 illustrates an example of the voice signal spectrum estimated by the audio signal processing apparatus of the embodiment. Referring to FIG. 7, a spectrogram 701 illustrates the audio signal in which the voice signal and the non-voice signal are mixed. In the spectrogram 701, black expresses the component of the voice signal, and gray expresses the component of the non-voice signal. In an ideal result of the estimated voice signal spectrogram, the gray expression is converted into white while the black expression is left.

Spectrograms 702 and 703 of the voice signal are estimated using the non-voice signal basis matrix produced from the spectrogram of an interval 705 determined to be the non-volume. The spectrogram 702 of the voice signal is estimated by the nonnegative matrix factorization using the first basis matrix H, and the spectrogram 703 of the voice signal is estimated by the nonnegative matrix factorization using the second basis matrix B. On the other hand, a spectrogram 704 of the voice signal is estimated using the non-voice signal spectrogram produced from a spectrogram of an interval 706, which has the low voice likelihood in each frame and is shorter than an interval 705. When compared with the spectrograms of FIG. 7, the black portion expressing the component of the voice signal is eliminated in the spectrograms 702 and 704. In the spectrogram 702, it is believed that production accuracy of the non-voice signal basis matrix is degraded by the influence of the audio signal included in the interval 705. In the spectrogram 704, it is believed that production accuracy of the non-voice signal basis matrix is degraded because the interval 706 has the insufficient length. On the other hand, in the spectrogram 703 performed by the audio signal processing apparatus of the embodiment, the component of the non-voice signal is removed while the component of the voice signal is left, and it is found that the spectrogram 703 expresses the ideal estimation result.

Advantageous Effect

As described above, the audio signal processing apparatus of the embodiment produces the second basis matrix by excluding the component having the high association with the voice signal from the produced first basis matrix of the non-voice signal. Therefore, the basis matrix of the non-voice signal can correctly be produced. As a result, and the voice signal separation performance can be improved.

Modifications

The audio signal processing apparatus of the embodiment is aimed at the separation of the voice signal and the non-voice signal. Alternatively, the audio signal processing apparatus of the embodiment can also be applied to separation of other signals. For example, a music signal and a non-music signal can be separated by the same way.

The spectral feature extracted by the spectral feature extractor 104 may be used in the case that the likelihood calculator 102 calculates the likelihood using the spectral feature. In this case, the likelihood calculator 102 can use the spectral feature extracted by the spectral feature extractor 104 as the audio feature.

In Steps S507 and S508 of FIG. 7, the non-voice signal basis matrix is produced every time the determination of the non-voice is made in Step S506. In the case that the non-voice signal basis matrix is already produced until the preceding interval of the target interval, the voice signal spectrogram can be estimated using the already-produced non-voice signal basis matrix while Steps S507 and S508 are skipped.

The audio signal processing apparatus of the embodiment produces the non-voice signal basis matrix from the spectrogram in the interval in which the voice/non-voice determination unit 103 determined that the voice signal is the non-voice. Alternatively, the non-voice signal basis matrix may be produced from the spectrogram in the head interval of 400 ms of the audio signal. Even if the voice signal is included in the interval, the second basis matrix generator 106 excludes the component of the voice signal, so that the accuracy of the produced non-voice signal basis matrix can be maintained.

A part of or all the functions in the above embodiment can be implemented by software processing.

Although the embodiment of the invention is described above only by way of example, the invention is not limited to the embodiment. Various changes, modifications, and substitutions can be made without departing from the scope of the invention.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form of the methods and systems described herein may be made without departing from the sprit of the inventions. The accompanying claims and their equivalents are intended to cover such forms or modifications as would fall within the scope and spirit of the inventions.

What is claimed is:

1. An audio signal processing apparatus utilized in pre-processing of speech recognition, the apparatus comprising:
    a likelihood calculation unit, executed by a processor using a program stored in a storage, configured to extract audio features expressing features of a voice signal and a non-voice signal from an audio signal including the voice signal and the non-voice signal, and calculate a likelihood expressing a probability that the voice signal is included in the audio signal;
    a spectral feature extraction unit, executed by the processor, configured to perform a frequency analysis to the audio signal to extract a spectral feature;
    a first basis matrix producing unit, executed by the processor, configured to produce a first basis matrix expressing the feature of the non-voice signal using the spectral feature;
    a second basis matrix producing unit, executed by the processor, configured to specify a component having a high association with the voice signal in the first basis matrix using the likelihood, and exclude the component from the first basis matrix to produce a second basis matrix; and
    a spectral feature estimation unit, executed by the processor, configured to estimate a spectral feature of the voice signal or a spectral feature of the non-voice signal by performing nonnegative matrix factorization to the spectral feature of the audio signal using the second basis matrix,
    wherein the spectral feature estimation unit produces a third basis matrix and a first coefficient matrix, which express the feature of the voice signal, by nonnegative matrix factorization in which the second basis matrix is used, and estimates the spectral feature of the voice signal included in the audio signal by a product of the third basis matrix and the first coefficient matrix, and wherein the product is used to separate the voice signal from the audio signal.

2. The apparatus according to claim 1, wherein the second basis matrix producing unit produces the second basis matrix by excluding a column vector having a high association with the voice signal from the first basis matrix.

3. The apparatus according to claim 1, wherein the second basis matrix producing unit produces the second basis matrix from the first basis matrix by replacing a value of a column vector having a high association with the voice signal with 0.

4. The apparatus according to claim 1, wherein the second basis matrix producing unit specifies a component having a high association with the voice signal in the first basis matrix by comparing the likelihood to a predetermined threshold.

5. The apparatus according to claim 1, further comprising:
    a voice/non-voice determination unit, executed by the processor, configured to extract the audio features expressing features of the voice signal and the non-voice signal from the audio signal, and determine whether the audio signal is the voice signal or the non-voice signal using the audio features,
    wherein the first basis matrix producing unit produces the first basis matrix expressing the feature of the non-voice signal using the spectral feature of the audio signal in which the voice/non-voice determination unit determines that the audio signal is the non-voice signal.

6. The apparatus according to claim 1, wherein the spectral feature estimation unit produces a second coefficient matrix expressing the feature of the non-voice signal by the nonnegative matrix factorization in which the second basis matrix is used, and estimates the spectral feature of the non-voice signal included in the audio signal by a product of the second basis matrix and the second coefficient matrix.

7. The apparatus according to claim 1, further comprising:
    an inverse transformation unit, executed by the processor, configured to transform the spectral feature estimated by the spectral feature estimation unit into a temporal signal.

8. An audio signal processing apparatus utilized in pre-processing of speech recognition, the apparatus comprising:
    a likelihood calculation unit, executed by a processor using a program stored in a storage, configured to extract audio features expressing features of a first audio signal and a second audio signal from a third audio signal including the first audio signal and the second audio signal, and calculate a likelihood expressing a probability that the first audio signal is included in the third audio signal;
    a spectral feature extraction unit, executed by the processor, configured to perform a frequency analysis to the third audio signal to extract a spectral feature;
    a first basis matrix producing unit, executed by the processor, configured to produce a first basis matrix expressing the feature of the second audio signal using the spectral feature;
    a second basis matrix producing unit, executed by the processor, configured to specify a component having a high association with the first audio signal in the first basis matrix using the likelihood, and exclude the component from the first basis matrix to produce a second basis matrix; and
    a spectral feature estimation unit, executed by the processor, configured to estimate a spectral feature of the first audio signal or a spectral feature of the second audio signal by performing nonnegative matrix factorization to the spectral feature of the third audio signal using the second basis matrix, wherein the spectral feature estimation unit produces a third basis matrix and a first coefficient matrix, which express the feature of the first audio signal, by nonnegative matrix factorization in which the second basis matrix is used, and estimates the spectral feature of the first audio signal included in the third audio signal by a product of the third basis matrix and the first coefficient matrix and wherein the product is used to separate the voice signal from the audio signal.

9. The apparatus according to claim 8, wherein the second basis matrix producing unit produces the second basis matrix by excluding a column vector having a high association with the first audio signal from the first basis matrix.

10. The apparatus according to claim 8, wherein the second basis matrix producing unit produces the second basis matrix from the first basis matrix by replacing a value of a column vector having a high association with the first audio signal with 0.

11. The apparatus according to claim 8, wherein the second basis matrix producing unit specifies a component having a high association with the first audio signal in the first basis matrix by comparing the likelihood to a predetermined threshold.

12. The apparatus according to claim 8, further comprising:
a first/second determination unit, executed by the processor, configured to extract the audio features expressing features of the first audio signal and the second audio signal from the third audio signal, and determine whether the third audio signal is the first audio signal or the second audio signal using the audio features,
wherein the first basis matrix producing unit produces the first basis matrix expressing the feature of the second audio signal using the spectral feature of the third audio signal in which the first/second determination unit determines that the third audio signal is the second audio signal.

13. The apparatus according to claim 8, wherein the spectral feature estimation unit produces a second coefficient matrix expressing the feature of the second audio signal by the nonnegative matrix factorization in which the second basis matrix is used, and estimates the spectral feature of the second audio signal included in the third audio signal by a product of the second basis matrix and the second coefficient matrix.

14. The apparatus according to claim 8, further comprising:

an inverse transformation unit, executed by the processor, configured to transform the spectral feature estimated by the spectral feature estimation unit into a temporal signal.

15. The apparatus according to claim 8, wherein the first audio signal is a voice signal and the second audio signal is a noise signal.

16. An audio signal processing method utilized in pre-processing of speech recognition, the method comprising:
extracting audio features expressing features of a first audio signal and a second audio signal from a third audio signal including the first audio signal and the second audio signal;
calculating a likelihood expressing a probability that the first audio signal is included in the third audio signal;
performing a frequency analysis to the third audio signal to extract a spectral feature;
producing a first basis matrix expressing the feature of the second audio signal using the spectral feature;
specifying a component having a high association with the first audio signal in the first basis matrix using the likelihood;
excluding the component from the first basis matrix to produce a second basis matrix; and
estimating a spectral feature of the first audio signal or a spectral feature of the second audio signal by performing nonnegative matrix factorization to the spectral feature of the third audio signal using the second basis matrix,
wherein
a third basis matrix and a first coefficient matrix, which express the feature of the first audio signal, are produced by nonnegative matrix factorization in which the second basis matrix is used, and
the spectral feature of the first audio signal included in the third audio signal, is estimated by a product of the third basis matrix and the first coefficient matrix and wherein the product is used to separate the voice signal from the audio signal.

17. The method according to claim 16, further comprising:
extracting the audio features expressing features of the first audio signal and the second audio signal from the third audio signal,
determining whether the third audio signal is the first audio signal or the second audio signal using the audio features,
wherein the first basis matrix expressing the feature of the second audio signal using the spectral feature of the third audio signal in which the third audio signal is the second audio signal is determined, is produced.

* * * * *